(12) United States Patent
Mistry et al.

(10) Patent No.: US 8,538,422 B1
(45) Date of Patent: Sep. 17, 2013

(54) REALLOCATION OF RESOURCES FOR DUAL-MODE WIRELESS DEVICES

(75) Inventors: Hetal J. Mistry, Herndon, VA (US); PinalKumari K. Tailor, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 682 days.

(21) Appl. No.: 12/423,101

(22) Filed: Apr. 14, 2009

(51) Int. Cl.
*H04W 4/00* (2009.01)

(52) U.S. Cl.
USPC ........... 455/434; 455/436; 455/437; 455/438; 455/439; 455/440; 455/441; 455/442; 455/443; 455/444; 370/338

(58) Field of Classification Search
USPC .......................... 455/434, 436–444; 370/338
See application file for complete search history.

(56) References Cited

U.S. PATENT DOCUMENTS

| | | | |
|---|---|---|---|
| 5,020,092 A | 5/1991 | Phillips et al. |
| 5,020,093 A | 5/1991 | Pireh |
| 5,550,895 A | 8/1996 | Burson et al. |
| 5,594,782 A | 1/1997 | Zicker et al. |
| 5,640,686 A | 6/1997 | Norimatsu |
| 5,754,542 A | 5/1998 | Ault et al. |
| 5,870,673 A | 2/1999 | Haartsen |
| 5,966,667 A | 10/1999 | Halloran et al. |
| 5,987,334 A | 11/1999 | Kaku |
| 6,006,106 A | 12/1999 | Cook et al. |
| 6,011,978 A | 1/2000 | Ault et al. |
| 6,112,088 A | 8/2000 | Haartsen |
| 6,125,283 A | 9/2000 | Kolev et al. |
| 6,198,941 B1 | 3/2001 | Aho et al. |
| 6,201,963 B1 | 3/2001 | Nakamura |
| 6,304,761 B1 | 10/2001 | Tsunehiro |
| 6,317,582 B1 | 11/2001 | Yoshinaga |
| 6,400,961 B1 | 6/2002 | Lillie et al. |
| 6,456,858 B1 | 9/2002 | Streter |
| 6,498,939 B1 | 12/2002 | Thomas |
| 6,526,034 B1 | 2/2003 | Gorsuch |
| 6,680,923 B1 | 1/2004 | Leon |
| 6,804,532 B1 | 10/2004 | Moon et al. |
| 6,862,277 B2 | 3/2005 | Pan et al. |
| 6,895,255 B1 | 5/2005 | Bridgelall |
| 6,904,029 B2 | 6/2005 | Fors et al. |

(Continued)

FOREIGN PATENT DOCUMENTS

GB 2288301 10/1995

OTHER PUBLICATIONS

Rajiv Chakravorty, et al., "On Inter-network Handover Performance using Mobile IPv6," Jun. 2003, 13 pages, University of Cambridge, United Kingdom.

(Continued)

*Primary Examiner* — Rafael Pérez-Gutiérrez
*Assistant Examiner* — Liton Miah

(57) ABSTRACT

A wireless service of a first type is scanned. A first station associated with the first type is selected. A first indicator of expected service conditions associated with the first station is received. Based on the first indicator, a wireless service of a second type is scanned. A second station associated with the second type is selected. A second indicator of expected service conditions associated with the second type is received. Based on the first indicator and the second indicator, one of the first type and second type is selected to receive wireless service.

20 Claims, 6 Drawing Sheets

(56) References Cited

U.S. PATENT DOCUMENTS

| | | |
|---|---|---|
| 6,922,559 B2 | 7/2005 | Mohammed |
| 6,990,598 B2 | 1/2006 | Sherburne, Jr. |
| 7,039,027 B2 | 5/2006 | Bridgelall |
| 7,114,010 B2 | 9/2006 | Karaoguz et al. |
| 7,139,587 B2 | 11/2006 | Ishii |
| 7,142,882 B2 | 11/2006 | Schmidt |
| 7,149,521 B2 | 12/2006 | Sundar et al. |
| 7,298,763 B2 | 11/2007 | Pickering et al. |
| 7,313,112 B2 | 12/2007 | Rajkotia |
| 7,610,049 B2 * | 10/2009 | Watanabe ............... 455/436 |
| 7,702,357 B2 * | 4/2010 | Yam ........................ 455/552.1 |
| 8,229,433 B2 * | 7/2012 | Parekh et al. ............ 455/436 |
| 2002/0039892 A1 | 4/2002 | Lindell |
| 2002/0059453 A1 | 5/2002 | Eriksson et al. |
| 2002/0085516 A1 | 7/2002 | Bridgelall |
| 2002/0147008 A1 | 10/2002 | Kallio |
| 2002/0173303 A1 | 11/2002 | Shibutani |
| 2003/0003869 A1 | 1/2003 | Fujii |
| 2003/0003910 A1 * | 1/2003 | McClure ................... 455/435 |
| 2003/0017842 A1 | 1/2003 | Moles et al. |
| 2003/0039242 A1 | 2/2003 | Moore, Jr. |
| 2003/0224795 A1 | 12/2003 | Wilhoite et al. |
| 2004/0146021 A1 | 7/2004 | Fors et al. |
| 2004/0170191 A1 * | 9/2004 | Guo et al. ................. 370/468 |
| 2004/0203789 A1 | 10/2004 | Hammond et al. |
| 2004/0203791 A1 | 10/2004 | Pan et al. |
| 2005/0083899 A1 * | 4/2005 | Babbar et al. ............ 370/342 |
| 2005/0119001 A1 * | 6/2005 | Watanabe ................. 455/436 |
| 2005/0136937 A1 * | 6/2005 | Qian et al. ................ 455/452.2 |
| 2005/0147068 A1 | 7/2005 | Rajkotia |
| 2006/0083199 A1 | 4/2006 | Yang |
| 2006/0111112 A1 | 5/2006 | Maveddat |
| 2006/0116127 A1 | 6/2006 | Wilhoite et al. |
| 2006/0268928 A1 * | 11/2006 | Barzegar et al. ......... 370/465 |
| 2007/0076664 A1 | 4/2007 | An et al. |
| 2008/0051130 A1 | 2/2008 | Juneja et al. |
| 2008/0096560 A1 | 4/2008 | Felske et al. |
| 2008/0254797 A1 | 10/2008 | Achtari et al. |
| 2009/0023446 A1 * | 1/2009 | Das .......................... 455/435.2 |
| 2009/0047946 A1 * | 2/2009 | Sato et al. ................ 455/426.1 |

OTHER PUBLICATIONS

Rajiv Chakravorty, et al., "Vertical Handoffs with Mobile IPv6," May 2003, 10 pages, University of Cambridge, United Kingdom.

Nguyen Hoaison, et al., "Personal Mesh: A Design of Flexible Internet Access for Personal Area Network," Oct. 2003, 5 pages, The University of Tokyo, Japan.

M. Ylianttila, et al., "Handoff Procedure for Heterogeneous Wireless Networks," Future Wireless Communication System, 1999, pp. 2783-2787, Global Telecommunications Conference.

Office Action from U.S. Appl. No. 10/933,596 mailed Aug. 23, 2006.
Office Action from U.S. Appl. No. 10/933,596 mailed Mar. 27, 2006.
Office Action from U.S. Appl. No. 10/927,271 mailed Dec. 31, 2007.
U.S. Appl. No. 10/934,011, filed Sep. 3, 2004.
U.S. Appl. No. 10/933,596, filed Sep. 3, 2004.
U.S. Appl. No. 10/927,271, filed Aug. 26, 2004.

* cited by examiner

REALLOCATION OF RESOURCES FOR DUAL-MODE WIRELESS DEVICES

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

OVERVIEW

A method of selecting a wireless network is disclosed. A wireless service of a first type is scanned. A first station associated with the first type is selected. A first indicator of expected service conditions associated with the first station is received. Based on the first indicator, a wireless service of a second type is scanned. A second station associated with the second type is selected. A second indicator of expected service conditions associated with the second type is received. Based on the first indicator and the second indicator, one of the first type and second type is selected to provide wireless service.

A method of operating a communication system is disclosed. On an access channel associated with a first type of wireless service, a connection request from a wireless device is received. A profile associated with the wireless device is determined. Based on the profile, the wireless device is allowed to request a first indicator of expected service conditions associated with the first type of wireless service. The first indicator of expected service conditions is sent to the wireless device. A second indicator of expected service conditions associated with a second type of wireless service is sent.

A communication system is disclosed. A first base station is configured to provide a first type of wireless service. The first base station is also configured to receive a first connection request from a wireless device and determine a profile associated with the wireless device. Based on the profile, the first base station allows the wireless device to request a first indicator of expected service conditions. The first indicator of expected service conditions is sent to the wireless device. A second base station is co-located with the first base station and configured to provide a second type of wireless service. The second base station is configured to send a second indicator of expected service conditions associated with the second type of wireless service.

DETAILED DESCRIPTION

In an embodiment, a dual-mode wireless device scans for a first type of wireless service (e.g., WiMAX or LTE). After selecting the strongest signal, the dual-mode device may request an indicator of expected service conditions. This indicator may comprise carrier-to-interference and noise ratio (CINR), expected serving modulation and coding scheme, expected air-interface throughput, network throughput, probability of being dropped, etc. Based on this indicator, the dual-mode device may decide to determine if it will be better served with a second type of wireless service (e.g., EV-DO).

To determine if it will be better served by the second type of wireless service, the dual-mode device scans for the second type of wireless service. Once the dual-mode device determines the level of service it will be provided using the second type of wireless service, the dual-mode device selects between the two types of wireless services. This determination may be based on information sent to the dual-mode device by the base station. Thus, for example, a dual-mode device may find it will receive a higher throughput using WiMAX service, but will get a more reliable connection via EV-DO. In this case, the dual-mode device can select between the two services depending upon those factors that it finds are important—in this example, throughput or reliability.

Figure 1:
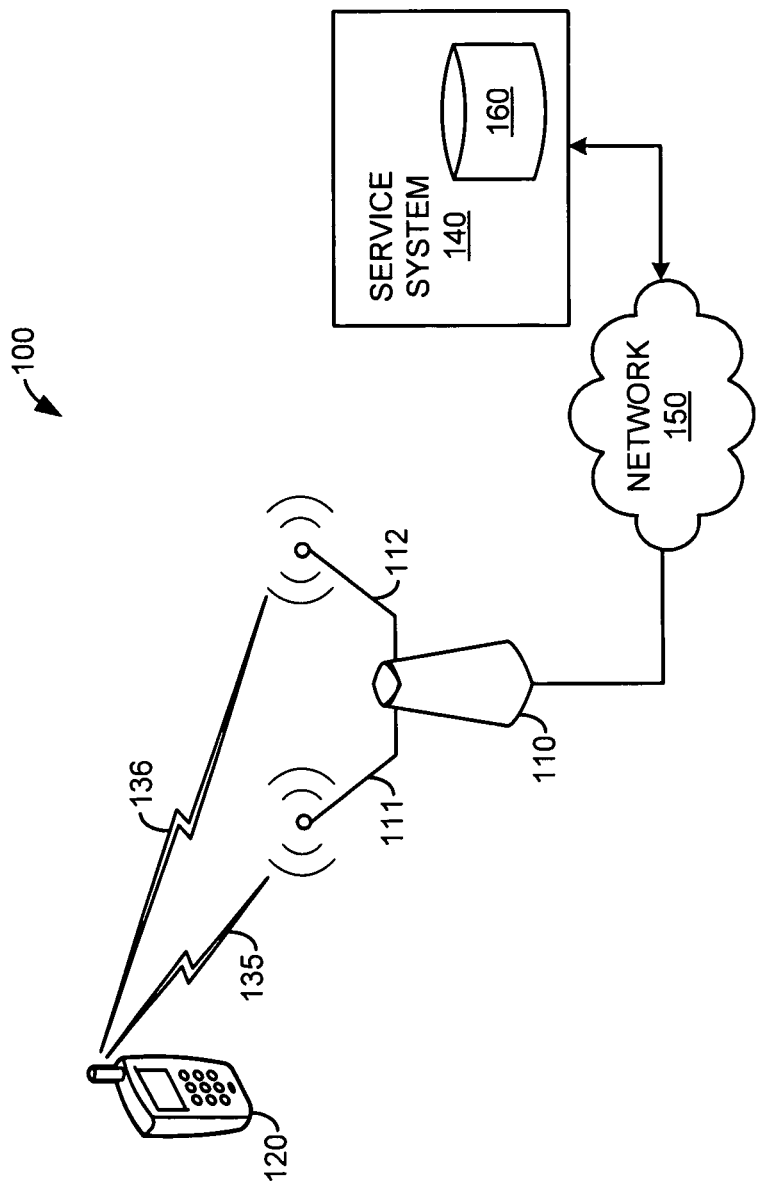
FIG. 1 is a block diagram illustrating a communication system.

FIG. 1 is a block diagram illustrating a communication system. In FIG. 1, communication system 100 comprises base station 110, wireless device 120, service system 140, and network 150. Base station 110 includes co-located wireless stations 111 and 112. Service system 140 may include database 160. Base station 110 is operatively coupled to network 150. Network 150 is operatively coupled to service system 140. Wireless device 120 may be operatively coupled to base station 110 via wireless link 135 and wireless station 111. Wireless device 120 may be operatively coupled to base station 110 via wireless link 136 and wireless station 112.

Wireless station 111 may provide a first type of wireless service to wireless device 120 via wireless link 135. For example, wireless station 111 may provide a wireless service based on orthogonal frequency division multiplexing (OFDM) or orthogonal frequency division multiple access (OFDMA). In another example, wireless station 111 may provide a high bandwidth wireless service based on modern standards. Examples of these high bandwidth wireless services include, but are not limited to, WiMAX and LTE. Other types of high bandwidth wireless services may be provided by wireless station 111.

Wireless station 112 may provide a second type of wireless service to wireless device 120 via wireless link 136. For example, wireless station 112 may provide wireless service that is based on code division multiple access (CDMA) or time division multiple access (TDMA). In another example, wireless station 112 may provide a wireless service that is based on cellular phone technology standards. Examples of wireless services based on cellular technologies include, but are not limited to, EV-DO, Global System for Mobile communications (GSM), CDMA, and TDMA. Other types of cellular technology type wireless services may be provided by wireless station 111.

Wireless device 120 may be any device, system, combination of devices, or other such communication platform capable of communicating with base station 110 via wireless stations 111 and 112 and wireless links 135 and 136, respectively. As discussed above, wireless links 135 and 136 provide communication between wireless device 120 and wireless stations 111 and 112 using two different wireless services. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links. Other types of communication platforms are possible.

Base station 110 may be any wireless system that provides two different types of wireless service air-interfaces to wireless device 120, and communication connectivity to network 150. Wireless station 111 and wireless station 112 may be any wireless system that each provide a single air-interface to wireless device 120 and communication connectivity to network 150. Examples of base stations and wireless stations that may be utilized include, base transceiver stations (BTSs), radio base stations (RBSs), Node B, enhanced Node B (eNBs) and others. Base stations and wireless stations may include a number of elements known to those skilled in the art comprising a transceiver, power amplifier, combiner, duplexer, antenna and control function.

Network 150 may comprise a computer, a network, or a collection of computers and networks that couple, link, or otherwise operatively provide wireless device 120 with communication service. It should be understood that network 150 may comprise secondary data networks. For example, network 150 may include a backhaul network, a local network, a long distance network, a packet network, or any combination thereof, as well as other types of networks. Network 150 may be or include an access service network (ASN), an access service network gateway (ASN-GW), wireless local access network access gateway (WAG), packet data gateway (PDG), mobile switching center (MSC) and packet data serving node (PDSN).

Network 150 is operatively coupled to service system 140. Since service system 140 includes database 160, and network 150 is operatively coupled to service system 140, network 150 is operatively coupled to database 160. Likewise, since base station 110 is operatively coupled to network 150, base station 110 (and thus wireless stations 111 and 112) may be operatively coupled to database 160.

Service system 140 may be any system or collection of systems, such as database 160, capable of storing and retrieving information about at least one of: (a) services provided by network 150; (b) services provided by or to networks, users, or a wireless device 120 connected to network 150; (c) configuration information for network 150; or, (d) configuration or capabilities associated with a wireless device 120. In an example, service system 140 is part of a connectivity service network (CSN) and performs authentication, authorization, and accounting operations. In another example, service system 140 is a device capabilities server (DCS) and provides information about wireless device 120. Service system 140 may manage user or device profiles for authentication (e.g., verifying device identifier, user name, or password).

Service system 140 may provide configuration information to network 150 or base station 110 that specifies a type of service to deliver, and policies to enforce that may restrict access by, or services provided to, wireless device 120. For example, when wireless device 120 first couples to wireless station 111, wireless device 120 may send a registration message to network 150 asking for permission to use base station 110 and network 150 to communicate to other systems. Wireless device 120 may send a registration message via an access channel. The registration message may include a device identifier. Network 150 may then forward that registration message, along with a device identifier to service system 140. Service system 140 may then query database 160 with the device identifier to determine if wireless device 120 may use base station 110 and network 150. Service system 140 may then inform base station 110 and network 150 whether wireless device 120 may use network 150.

A device identifier may be one or more of, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 160 to provide configuration information to base station 110 and network 150 that determines how wireless device 120 may use base station 110 and network 150. For example, service system 140 may configure base station 110 to allow wireless device 120 request a desired signal strength, modulation and coding scheme (MCS), throughput rate, available throughput and/or network loading during the initial connection process. Thus, wireless device 120 would not have to wait for the connection to be established and then send a request for desired service conditions. For example, wireless device 120 would not have to wait for the connection to be established to then send a data rate control (DRC) request.

In an embodiment, wireless device 120 may scan for a wireless service of a first type. Wireless device 120 may scan for the wireless service of the first type for a first predetermined period of time. For example, wireless device 120 may first scan for a wireless service of the type provided by wireless station 111. The scanning process may result in wireless device 120 selecting wireless station 111. Wireless device 120 may select wireless station 111 as the first wireless station to provide an indicator of expected service conditions. Wireless device 120 may initiate the initial connection process with wireless station 111. During this initial connection process, wireless device 120 may request an indicator of expected service conditions. Wireless device 120 may send a request for an indicator of expected service conditions via an access channel. For example, wireless device 120 may request one or more of a desired signal strength, modulation and coding scheme (MCS), throughput rate, available throughput and/or network loading. In response to this request, one or more of wireless station 111, base station 110, or network 150 may provide a first indicator of expected service conditions. This first indicator of expected service conditions may be received by wireless device 120 via wireless link 135. This first indicator of expected service conditions may be received by wireless device 120 via an access channel.

Based on the first indicator of expected service conditions, wireless device 120 may scan for a wireless service of the second type. Wireless device 120 may scan for the wireless service of the second type for a second predetermined period of time. For example, if wireless station 111 sends a first indicator of expected service conditions associated with an MCS, and that MCS is not adequate for wireless device 120's requirements, then wireless device 120 may scan for the second type of wireless service provided by wireless station 112. Likewise, wireless device 120 may determine to scan for a second type of wireless service based on one or more received indicators of expected service conditions associated with, for example, signal strength, throughput rate, available throughput and/or network loading.

The process of scanning for a second type of wireless service may result in wireless device 120 selecting wireless station 112. Wireless device 120 may select wireless station 112 to provide an indicator of expected service conditions. Wireless device 120 may initiate the initial connection process with wireless station 112. During this initial connection process, wireless device 120 may request an indicator of expected service conditions. Wireless device 120 may send this request for an indicator of expected service conditions via an access channel. As a result, one or more of wireless station 112, base station 110, or network 150 may provide a second indicator of expected service conditions. This second indicator of expected service conditions may be received by wireless device 120 via wireless link 136. Wireless device 120 may receive this second indicator of expected service conditions via an access channel.

In an embodiment, based on the first indicator and the second indicator of expected service conditions, wireless device 120 may select one of the first type of wireless service or the second type of wireless service. For example, based on the first indicator and the second indicator, wireless device 120 may select between wireless station 111 and wireless station 112 to provide wireless service to wireless device 120.

Figure 2:
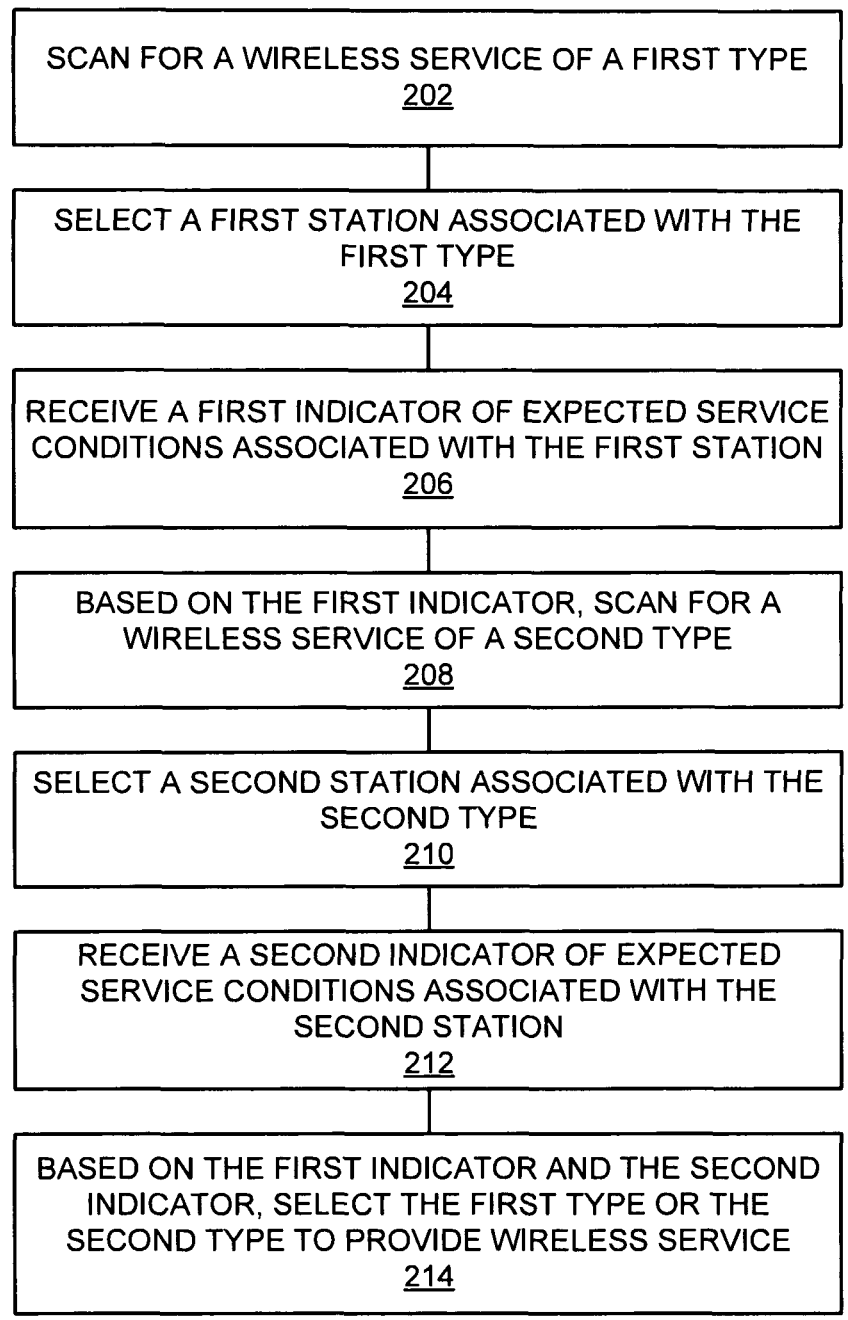
FIG. 2 is a flow chart illustrating a method of selecting a wireless network.

FIG. 2 is a flow chart illustrating a method of selecting a wireless network. The steps illustrated in FIG. 2 may be performed by one or more elements of communication system 100.

A wireless service of a first type is scanned (202). For example, wireless device 120 may scan for a wireless service of a first type. This first type of wireless service may be the type of wireless service provided by wireless station 111. A first wireless station associated with the first type of wireless service is selected (204). For example, wireless device 120 may select wireless station 111. This selection may be based on a received signal strength associated with wireless station 111.

A first indicator of expected service conditions associated with the first station is received (206). For example, wireless device 120 may receive a first indicator of expected service conditions via wireless link 135. This first indicator of expected service conditions may be associated with one or more of: signal strength, MCS, throughput rate, available throughput, and/or network loading.

A wireless service of the second type is scanned for based on the first indicator (208). For example, based on the first indicator, wireless device 120 may scan for a second type of wireless service. The second type of wireless service may be the type of wireless service provided by wireless station 112. Wireless device 120 may decide to scan for the second type of wireless service because the first indicator was associated with a level of wireless service that would not meet wireless device 120's desired service level.

A second station associated with the second type of wireless service is selected (210). For example, wireless device 120 may select wireless station 112. This selection may be based on a received signal strength.

A second indicator of expected service conditions associated with the second station is received (212). For example, wireless device 120 may receive a second indicator of expected service conditions associated with wireless station 112. This second indicator of expected service conditions may be associated with one or more of: signal strength, MCS, throughput rate, available throughput and/or network loading.

Based on the first indicator and the second indicator of expected service conditions, the first type or the second type of wireless service is selected to provide wireless service (214). For example, based on the first and second indicators wireless device 120 may select one of wireless station 111 and wireless station 112 to provide wireless service to wireless device 120. This selection may be based on which of wireless station 111 and wireless station 112 is best able to provide the service conditions that wireless device 120 desires and/or requires.

Figure 3:
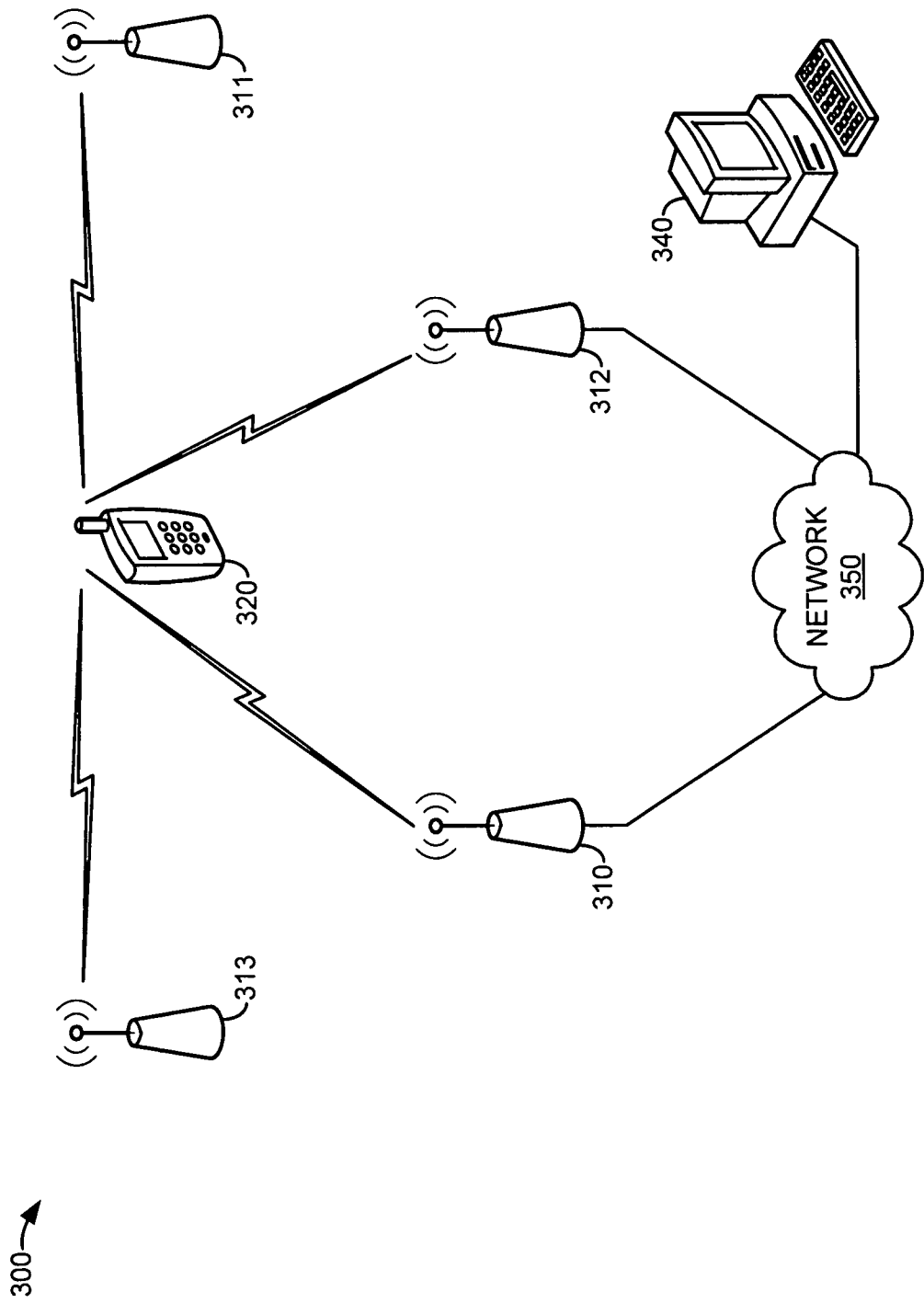
FIG. 3 is a block diagram illustrating a communication system.

FIG. 3 is a block diagram illustrating a communication system. In FIG. 3, communication system 300 comprises base station 310, base station 311, base station 312, base station 313, wireless device 320, service system 340, and network 350. Base station 310 is operatively coupled to network 350. Base station 312 is operatively coupled to network 350. Network 350 is operatively coupled to service system 340. Wireless device 320 may be operatively coupled to base stations 310-313 via wireless links.

Base stations 310 and 311 may provide a first type of wireless service. For example, base stations 310 and 311 may provide a wireless service based on OFDM or OFDMA. In another example, base stations 310 and 311 may provide a high bandwidth wireless service based on modern standards. Examples of these high bandwidth wireless services include, but are not limited to, WiMAX and LTE. Other types of high bandwidth wireless services may be provided by base stations 310 and 311.

Base stations 312 and 313 may provide a second type of wireless. For example, base stations 312 and 313 may provide wireless service that is based on CDMA or TDMA. In another example, base stations 312 and 313 may provide a wireless service that is based on cellular phone technology standards. Examples of wireless services based on cellular technologies include, but are not limited to, EV-DO, Global System for Mobile communications (GSM), CDMA, and TDMA. Other types of cellular technology type wireless services may be provided by base stations 312 and 313.

Wireless device 320 may be any device, system, combination of devices, or other such communication platform capable of communicating with base stations 310 and 311 using a first type of wireless service, and base station 312 and 313 using a second type of wireless service. Wireless device 320 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base stations 310-313 via wireless links. Other types of communication platforms are possible.

Base stations 310 and 311 may be any wireless system that provides a first type of wireless service air-interface to wireless device 320, and communication connectivity to network 150. Base stations 312 and 313 may be any wireless system that provides a second type of wireless service air-interface to wireless device 320, and communication connectivity to network 150. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 350 may comprise a computer, a network, or a collection of computers and networks that couple, link, or otherwise operatively provide wireless device 320 with communication service. It should be understood that network 350 may comprise secondary data networks. For example, network 350 may include a backhaul network, a local network, a long distance network, a packet network, or any combination thereof, as well as other types of networks. Network 350 may be or include an access service network (ASN), an access service network gateway (ASN-GW), wireless local access network access gateway (WAG), packet data gateway (PDG), mobile switching center (MSC) and packet data serving node (PDSN).

Network 350 is operatively coupled to service system 340. Since base stations 310-313 are operatively coupled to network 350, base stations 310-313 may be operatively coupled to service system 340.

Service system 340 may be any system or collection of systems, such as a database, capable of storing and retrieving information about at least one of: (a) services provided by network 350; (b) services provided by or to networks, users, or wireless device 320 connected to network 350; (c) configuration information for network 350; or, (d) configuration or capabilities associated with a wireless device 320. In an example, service system 340 is part of a CSN and performs authentication, authorization, and accounting operations. In another example, service system 340 is a device capabilities server (DCS) and provides information about wireless device 320. Service system 340 may manage user or device profiles for authentication (e.g., verifying device identifier, user name, or password).

Service system 340 may provide configuration information to network 350 or base stations 310-313 that specifies a type of service to deliver, and policies to enforce that may restrict access by, or services provided to, wireless device 320. For example, when wireless device 320 first couples to base station 310, wireless device 320 may send a registration message to network 350 asking for permission to use base station 310 and network 350 to communicate to other systems. This registration message may be sent via an access channel. The registration message may include a device identifier. Network 350 may then forward that registration message, along with a device identifier to service system 340. Service system 340 may then determine if wireless device 320 may use base station 310 and network 350. Service system 340 may then inform base station 310 and network 350 whether wireless device 320 may use network 350.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 340 may also provide configuration information to base station 310 and network 350 that determines how wireless device 320 may use base station 310 and network 350. For example, service system 340 may configure base station 310 to allow wireless device 320 request a desired signal strength, modulation and coding scheme (MCS), throughput rate, available throughput and/or network loading during the initial connection process. Base station 310 may be configured to allow one or more of these requests to be received via an access channel. Thus, wireless device 320 would not have to wait for the connection to be established and then send a request for desired service conditions. For example, wireless device 320 would not have to wait for the connection to be established to then send a data rate control (DRC) request.

In an embodiment, wireless device 320 may scan for a wireless service of a first type. Wireless device 320 may scan for the wireless service of the first type for a first predetermined period of time. For example, wireless device 320 may first scan for a wireless service of the type provided by base station 310. The scanning process may result in wireless device 320 selecting base station 310. Wireless device 320 may select base station 310 to provide an indicator of expected service conditions. Wireless device 320 may initiate the initial connection process with base station 310. During this initial connection process, wireless device 320 may request an indicator of expected service conditions. For example, wireless device 320 may request one or more of a desired signal strength, modulation and coding scheme (MCS), throughput rate, available throughput and/or network loading. This request may be sent via an access channel. In response to this request, base station 310, or network 150, may provide a first indicator of expected service conditions. This first indicator of expected service conditions may be received by wireless device 320 via a wireless link. This first indicator of expected service conditions may be received via an access channel.

Based on the first indicator of expected service conditions, wireless device 320 may scan for a wireless service of the second type. Wireless device 320 may scan for the wireless service of the second type for a second predetermined period of time. For example, if base station 310 sends a first indicator of expected service conditions associated with an MCS, and that MCS is not adequate for wireless device 320's requirements, then wireless device 320 may scan for a type of wireless service provided by base stations 312 and 313. Wireless device 320 may determine to scan for a second type of wireless service based on received indicators of expected service conditions associated with signal strength, throughput rate, available throughput and/or network loading.

The process of scanning for a second type of wireless service may result in wireless device 320 selecting base station 312. Wireless device 320 may select station 312 to provide an indicator of expected service conditions. Wireless device 320 may initiate the initial connection process with station 312. During this initial connection process, wireless device 320 may request an indicator of expected service conditions. This request may be made via an access channel. As a result, base station 312, or network 350 may provide a second indicator of expected service conditions. This second indicator of expected service conditions may be received by wireless device 320 via a wireless link. This second indicator of expected service conditions may be received via an access channel.

In an embodiment, based on the first indicator in the second indicator of expected service conditions wireless device 320 may select one of the first type of wireless service or the second type of wireless service. For example, based on the first indicator and the second indicator wireless device 320 may select between station 310 and base station 312 to provide wireless service.

Figure 4:
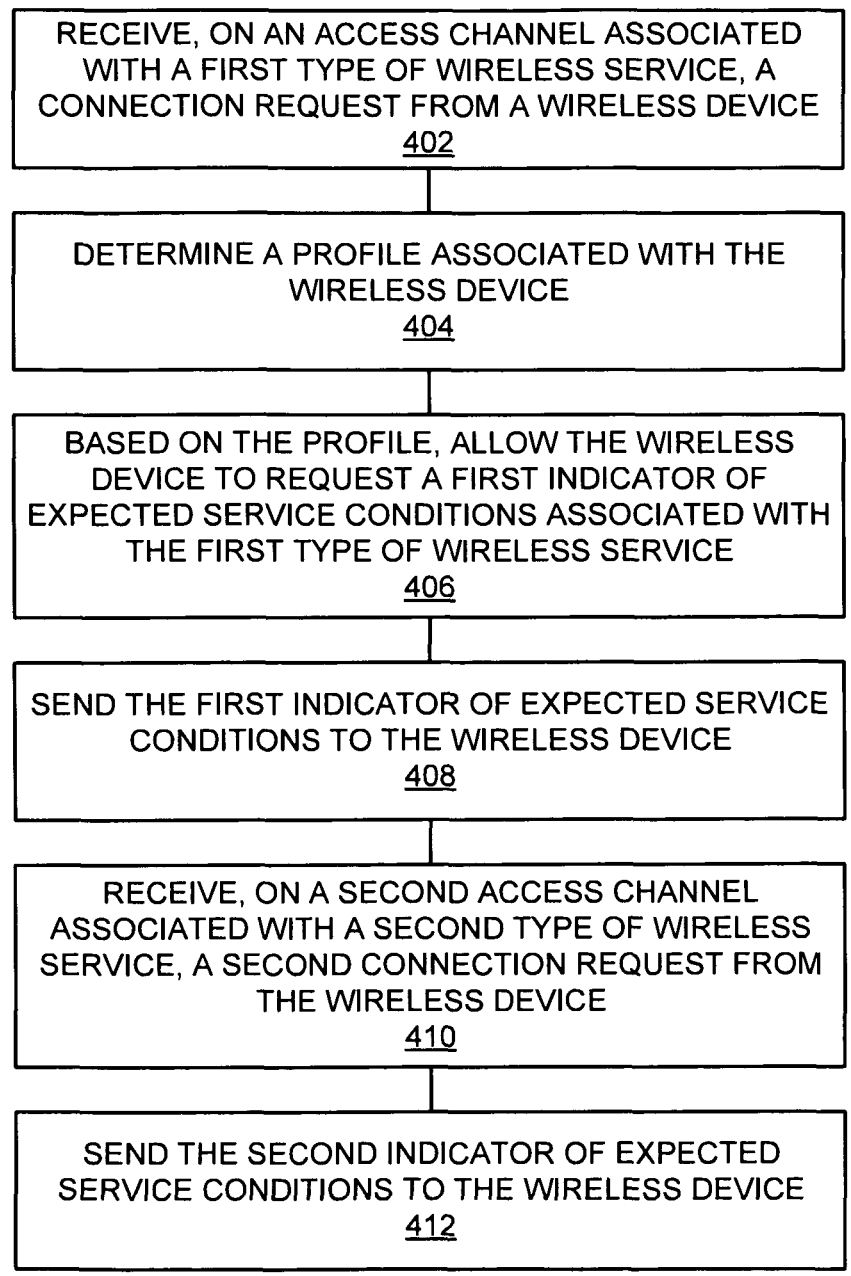
FIG. 4 is a flow chart illustrating a method of operating a communication system.

FIG. 4 is a flow chart illustrating a method of selecting a wireless network. The steps illustrated in FIG. 4 may be performed by one or more elements of communication system 100 or communication system 300.

On an access channel associated with the first type of wireless service a connection request from a wireless device is received (402). For example, on an access channel associated with the type of wireless service provided by base stations 310 and 311, base station 310 may receive a wireless service connection request from wireless device 320. The profile associated with the wireless device is determined (404). For example, service system 340 may determine a profile associated with wireless device 320. This profile a be associated with a user profile or service level that allows wireless device 320 to request a desired MCS, throughput rate, signal strength, network loading, and/or available throughput.

Based on the profile, the wireless device is allowed to request a first indicator of expected service conditions associated with the first type of wireless service (406). For example, based on the profile received from service system 340, base station 310 may allow wireless device 320 request a first indicator of expected service conditions. Base station 310 may allow wireless device 320 to request the first indicator of expected service conditions via an access channel.

The first indicator of expected service conditions is sent to the wireless device (408). For example, base station 310 may send you the first indicator of expected service conditions to wireless device 320 via a wireless link. This wireless link may be via an access channel.

On a second access channel associated with a second type of wireless service, a second connection request from the wireless device is received (410). For example, base station 312 may receive a connection request, on an access channel, from wireless device 320. This connection request may have been sent by wireless device 320 because the first indicator of expected service conditions failed to meet a minimum level of service required, or expected, by wireless device 320.

A second indicator of expected service conditions is sent to the wireless device (412). For example, base station 312 may send an indicator of expected service conditions to wireless device 320. These expected service conditions may be associated with a second type of wireless service as provided by base station 312. The indicator of expected service conditions may be sent in response to a request by wireless device 320. Based on the first and second indicators of expected service conditions wireless device 320 may select at a base station 310 or 312 to provide wireless service, or choose to continue scanning for other base stations. Wireless device 320 may scan for base stations, such as base station 311 and base station 313, that may be able to provide satisfactory service conditions.

Figure 5:
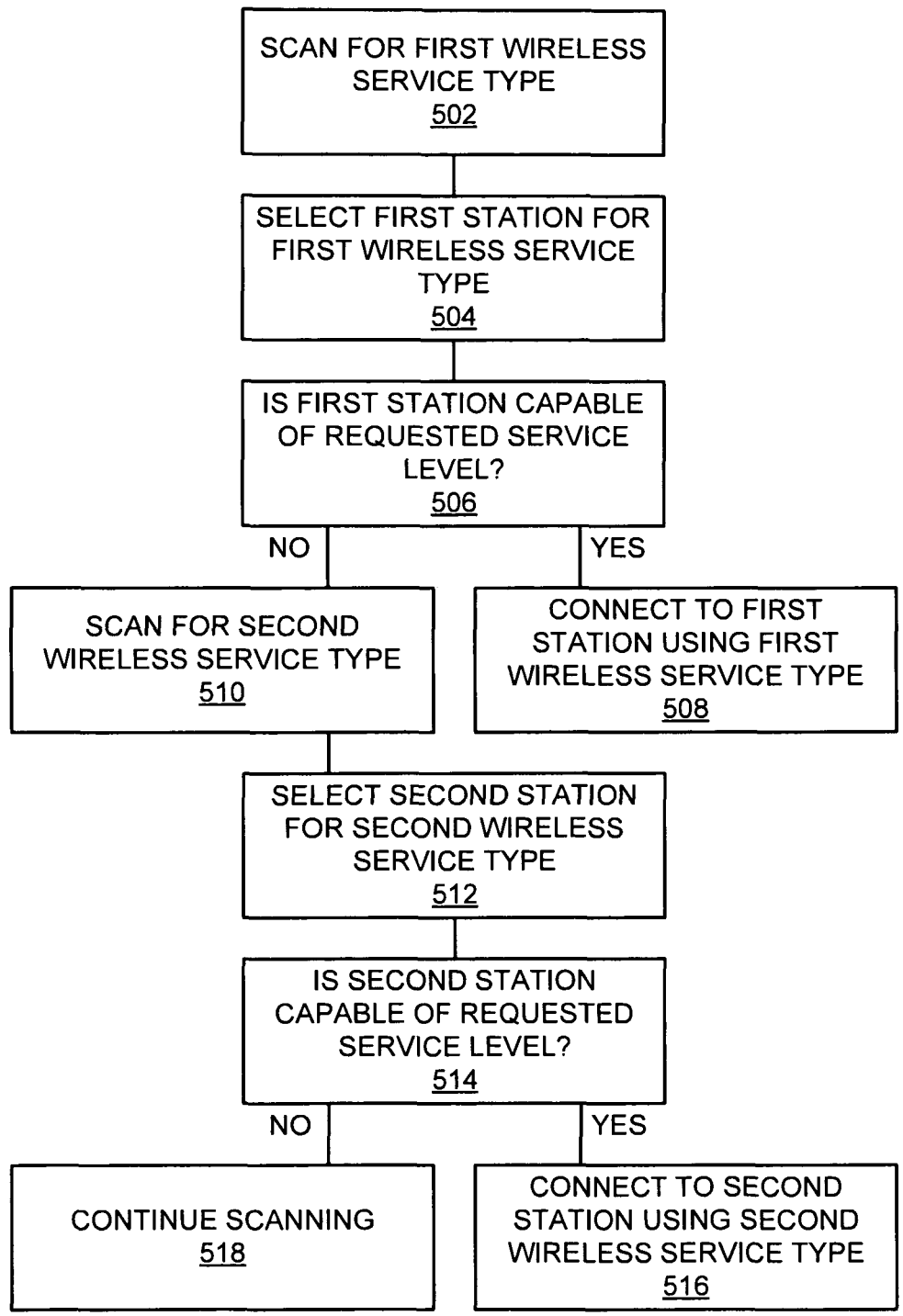
FIG. 5 is a flow chart illustrating a method of selecting a wireless network.

FIG. 5 is a flow chart illustrating a method of selecting a wireless network. The steps illustrated in FIG. 5 may be performed by one or more elements of communication system 100 or communication system 300.

A first wireless service type is scanned (502). For example, wireless device 320 may scan for the type of wireless service provided by base stations 310 and 311. A first station for the first wireless service type is selected (504). For example, wireless device 320 may select base station 310 over base station 311. This selection may be based on signal strength or other factors.

If the first station is capable of a requested service level, flow proceeds to block 508. If the first station is not capable of the requested service level, flow proceeds to block 510 (506). For example, if base station 310 is capable of providing a requested service level then flow would proceed to block 508. In block 508, wireless device 320 would connect to the first station using the first wireless service type. In other words, if base station 310 is capable of providing a service level requested by wireless device 320, then wireless device 320 would connect base station 310. Wireless device 320 may determine if base station 310 is capable of providing an adequate service level based on a received indicator of expected service conditions.

A second wireless service type is scanned (510). For example, wireless device 320 may scan for the type of wireless service provided by base stations 312 and 313. A second station for the second wireless service type is selected (512). For example, wireless device 320 may select base station 312 over base station 313. This selection may be based on signal strength or other factors.

If the second station is capable of a requested service level, flow proceeds to block 516. If the second station is not capable of the requested service level, flow proceeds to block 518 (514). For example, if base station 312 is capable of providing a requested service level, then flow would proceed to block 516. In block 516, wireless device 320 would connect to the second station using the second wireless service type. In other words, if base station 312 is capable of providing a service level requested by wireless device 320, then wireless device 320 would connect base station 312. Wireless device 320 may determine if base station 312 is capable of providing an adequate service level based on a received indicator of expected service conditions.

Scanning is continued (518). For example, because neither base station 310 or base station 312 were able to provide an adequate service level, wireless device 320 may continue to scan for wireless services of the first type and the second type. Thus, flow may proceed back to block 502. In this case, wireless device 320 may select base station 311 over base station 310 because it already knows that base station 310 cannot provide the requested service level. Likewise, wireless device 320 may select base station 313 over base station 312 because it already knows that base station 312 cannot provide the requested service level.

The methods, systems, devices, networks, databases, wireless stations, and base stations described above may be implemented with, contain, or be executed by one or more computer systems. The methods described above may also be stored on a computer readable medium. Many of the elements of communication network 100 and communication network 300 may be, comprise, or include computers systems. This includes, but is not limited to: communication system 100, base station 110, wireless device 120, service system 140, database 160, network 150, wireless stations 111, wireless station 112, communication system 300, base station 310, base station 311, base station 312, base station 313, wireless device 320, service system 340, and network 350.

Figure 6:
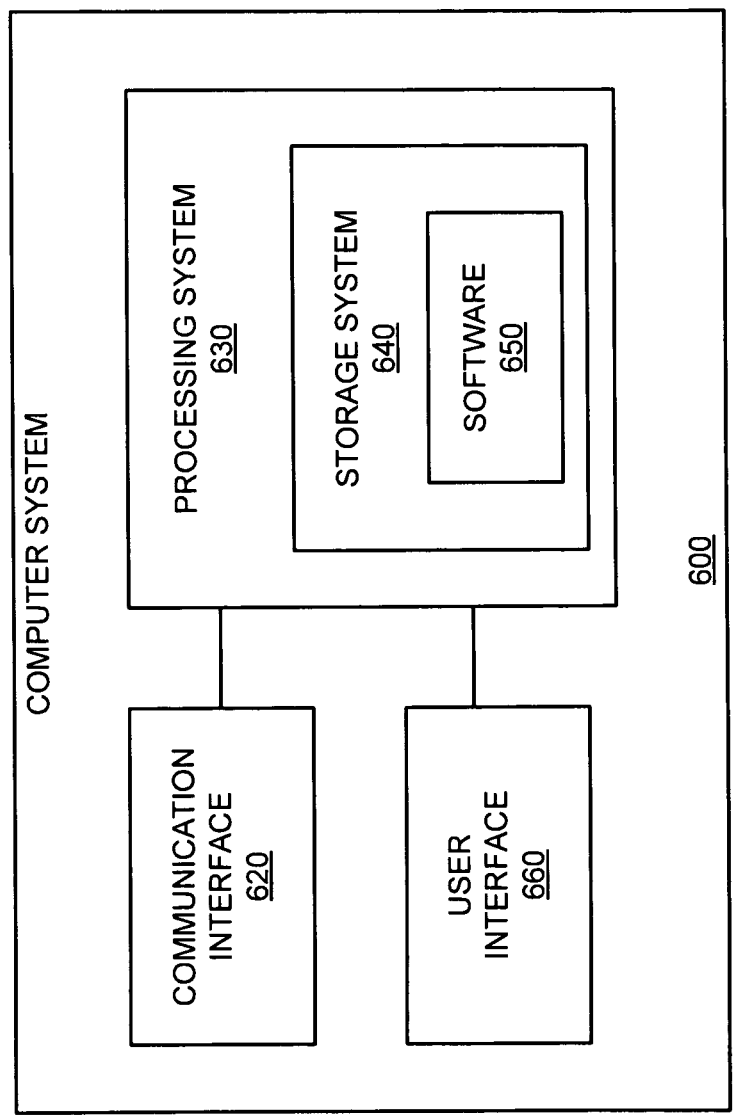
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless device to select a wireless network, comprising:
   in the wireless device, scanning for a wireless service of a first type;
   in the wireless device, selecting a first station associated with the first type;
   in the wireless device, receiving a first indicator of expected service conditions associated with the first station;
   based on the first indicator, scanning for a wireless service of a second type in the wireless device;
   in the wireless device, selecting a second station associated with the second type;
   in the wireless device, receiving a second indicator of expected service conditions associated with the second type; and,
   based on the first indicator and the second indicator, selecting one of the first type and second type to provide wireless service for the wireless device.

2. The method of claim 1, wherein the first indicator comprises an indicator associated with signal strength.

3. The method of claim 1, wherein the first indicator comprises an indicator associated with network loading.

4. The method of claim 1, wherein the first indicator comprises an indicator associated with available throughput.

5. The method of claim 1, wherein the first indicator comprises an indicator associated with an available modulation and coding scheme.

6. The method of claim 1, wherein scanning for the wireless service of the first type is performed for a first period of time and scanning for the wireless service of the second type is performed for a second period of time.

7. The method of claim 1, wherein the wireless service of the first type is a high bandwidth wireless service.

8. The method of claim 1, wherein the wireless service of the second type is cellular service.

9. A method of operating a communication system, comprising:
   receiving in a first base station, on an access channel associated with a first type of wireless service, a connection request from a wireless device;
   in the first base station, determining a profile associated with the wireless device;
   in the first base station, based on the profile, allowing the wireless device to request a first indicator of expected service conditions associated with the first type of wireless service;
   in the first base station, sending the first indicator of expected service conditions to the wireless device; and,
   sending a second indicator of expected service conditions associated with a second type of wireless service.

10. The method of claim 9, wherein the first indicator of expected service conditions comprises an indicator associated with signal strength.

11. The method of claim 9, wherein first indicator of expected service conditions comprises an indicator associated with network loading.

12. The method of claim 9, wherein the first indicator of expected service conditions comprises an indicator associated with available throughput.

13. The method of claim 9, wherein the first indicator of expected service conditions comprises an indicator associated with an available modulation and coding scheme.

14. The method of claim 9, further comprising:
   receiving, on a second access channel associated with the second type of wireless service, a second connection request from the wireless device.

15. The method of claim 9, wherein the first type of wireless service is high bandwidth wireless service.

16. The method of claim 9, wherein the second type of wireless service is a cellular service.

17. A communication system, comprising:
   a first base station configured to provide a first type of wireless service, the first base station also configured to receive a first connection request from a wireless device, determine a profile associated with the wireless device, and, based on the profile, allow the wireless device to request a first indicator of expected service conditions and send first indicator of expected service conditions to the wireless device; and,
   a second base station co-located with the first base station and configured to provide a second type of wireless service, the second base station also configured to send a second indicator of expected service conditions associated with the second type of wireless service.

18. The communication system of claim 17, wherein the second base station is also configured to receive a second connection request, associated with the second type of wireless service, from the wireless device.

19. The communication system of claim 17, wherein the wireless device is configured to select a type of wireless service based on the first indicator of expected service conditions.

20. The communication system of claim 17, wherein the wireless device is configured to select the first type of wireless service based on the first indicator of expected service conditions satisfying a criteria.

* * * * *